United States Patent [19]
Lavoie

[11] Patent Number: 6,013,901
[45] Date of Patent: Jan. 11, 2000

[54] PORTABLE HEATED CUP WITH MOTION SENSOR AND TIMER

[76] Inventor: Manon Lavoie, 91 Walnut St., Seymour, Conn. 06483

[21] Appl. No.: 08/933,172

[22] Filed: Sep. 18, 1997

[51] Int. Cl.⁷ ............................................... H05B 1/02
[52] U.S. Cl. ................................... 219/435; 219/432
[58] Field of Search ............................ 219/441, 429, 219/386, 387, 433, 438, 518, 250, 251, 252, 435, 432; 220/703

[56] References Cited

U.S. PATENT DOCUMENTS

| 3,432,641 | 3/1969 | Welke | 219/433 |
|---|---|---|---|
| 3,488,473 | 1/1970 | Sanders | 219/441 |
| 4,442,343 | 4/1984 | Genuit | 219/433 |
| 4,481,410 | 11/1984 | Bortnick | 219/521 |
| 4,713,522 | 12/1987 | Kimura | 219/202 |
| 4,745,260 | 5/1988 | Albinger | 219/250 |
| 4,801,782 | 1/1989 | Ineson | 219/438 |
| 4,922,355 | 5/1990 | Dietz | 362/101 |
| 4,980,539 | 12/1990 | Walton | 219/432 |
| 5,805,767 | 9/1998 | Jouas et al. | 392/373 |

Primary Examiner—John A. Jeffery

[57] ABSTRACT

A heated container includes a cup with a heating coil for heating the cup upon the receipt of power. Further included is a timer that is adapted to transmit an activation signal for a predetermined amount of time upon at least the instantaneous receipt thereof. Connected to the timer is a motion sensor for transmitting the activation signal thereto upon the detection of movement of the base and cup. A relay is connected between the timer, heating coil and a battery. The relay is adapted to allow the transmission of power from the battery to the heating coil only during the receipt of the activation signal.

7 Claims, 2 Drawing Sheets

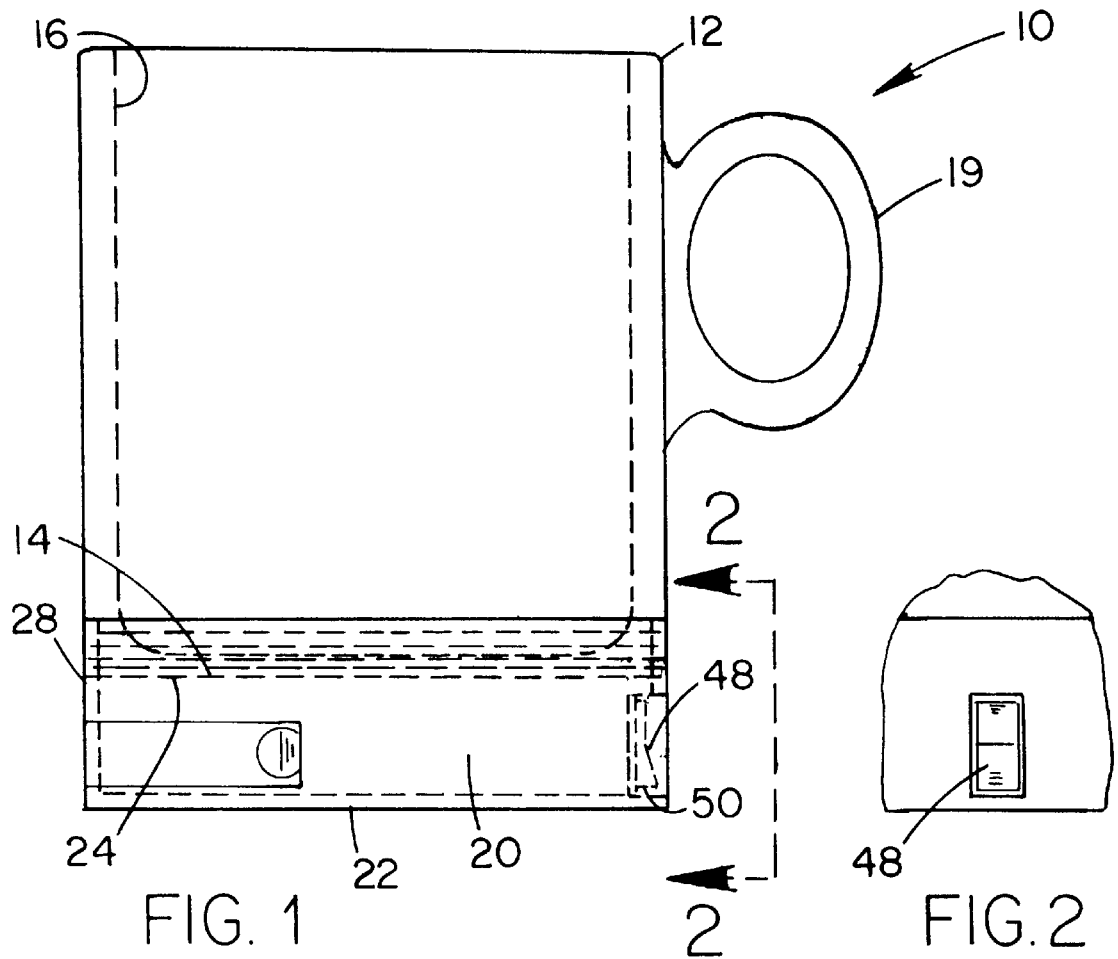
FIG. 1
FIG. 2
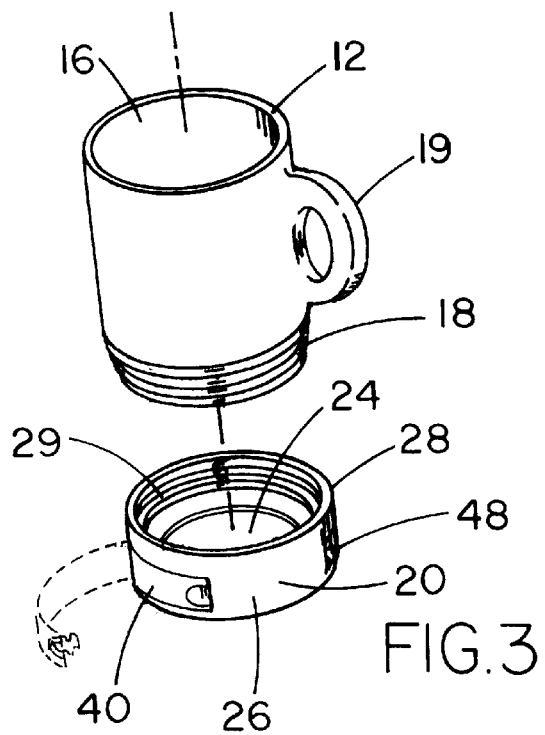
FIG. 3

PORTABLE HEATED CUP WITH MOTION SENSOR AND TIMER

BACKGROUND OF THE INVENTION

1. Field of the Invention

The present invention relates to heated containers and more particularly pertains to a new portable heated cup for maintaining a liquid in a cup at a desired temperature only during use.

2. Description of the Prior Art

The use of heated containers is known in the prior art. More specifically, heated containers heretofore devised and utilized are known to consist basically of familiar, expected and obvious structural configurations, notwithstanding the myriad of designs encompassed by the crowded prior art which have been developed for the fulfillment of countless objectives and requirements.

Known prior art heated containers include U.S. Pat. No. 5,283,420; U.S. Pat. No. 4,801,782; U.S. Pat. No. 4,095,090; U.S. Pat. No. 3,391,494; U.S. Pat. No. 4,463,664; and U.S. Pat. Des. 333,756.

In these respects, the portable heated cup according to the present invention substantially departs from the conventional concepts and designs of the prior art, and in so doing provides an apparatus primarily developed for the purpose of maintaining a liquid in a cup at a desired temperature only during use.

SUMMARY OF THE INVENTION

In view of the foregoing disadvantages inherent in the known types of heated containers now present in the prior art, the present invention provides a new portable heated cup construction wherein the same can be utilized for maintaining a liquid in a cup at a desired temperature only during use.

The general purpose of the present invention, which will be described subsequently in greater detail, is to provide a new portable heated cup apparatus and method which has many of the advantages of the heated containers mentioned heretofore and many novel features that result in a new portable heated cup which is not anticipated, rendered obvious, suggested, or even implied by any of the prior art heated containers, either alone or in any combination thereof.

To attain this, the present invention generally comprises a cup having a cylindrical configuration. As shown in FIGS. 1 & 3, the cup is equipped with a circular bottom face and a periphery integrally coupled thereto and extending upwardly therefrom to define an interior space and an open top for receiving a fluid. The periphery of the cup has threaded grooves formed in an outer surface thereof adjacent the bottom face of the cup. The cup includes a closed loop handle integrally coupled to a central extent of the periphery thereof and extending outwardly therefrom for gripping purposes. Next provided is a base defined by a circular bottom face, a circular top face, and a periphery formed therebetween forming an interior space. The base further includes an annular lip integrally formed about a periphery of the top face of the base and extended upwardly therefrom in coaxial alignment with the periphery of the base. A plurality of threaded grooves are formed in an inner surface of the annular lip for engaging the threaded grooves of the cup. When engaged, the outer surface of the cup is contiguous with an outer surface of the annular lip of the base. As best shown in FIGS. 4 & 5, a heating coil is mounted within the annular lip and the top face of the base. In use the heating coil is adapted for heating the cup upon the receipt of power and the engagement of the base with the cup. A timer means is situated within the interior space of the base and is adapted to transmit an activation signal for approximately 30 minutes upon at least the instantaneous receipt thereof. Also situated within the interior space of the base is a motion sensor means. Such motion sensor means is connected to the timer means for transmitting the activation signal thereto upon the detection of movement of the base and cup. To provide adequate power to the heating coil when motion is sensed, a relay means is situated within the interior space of the base and connected between the timer means, heating coil and a battery. The relay means is adapted to allow the transmission of power from the battery to the heating coil only during the receipt of the activation signal. The relay means thus functions as a voltage controlled switch. Situated within the base is a thermostat means connected between the relay means and the heating coil. The thermostat means precludes the transfer of power to the heating coil only upon a temperature detected being greater than or equal to a first user selected temperature. For safety reasons, a high temperature cut off means is connected between the relay means and the heating coil for precluding the transfer of power to the heating coil only upon a temperature detected being greater than or equal to a second predetermined temperature. Finally, a manual switch is mounted on the outer surface of the periphery of the base. Note FIG. 2. Such switch is connected between the battery and the heating coil for allowing the transfer of power thereto only upon the manual closing thereof.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new portable heated cup apparatus and method which has many of the advantages of the heated containers mentioned heretofore and many novel features that result in a new portable heated cup which is not anticipated, rendered obvious, suggested, or even implied by any of the prior art heated containers, either alone or in any combination thereof.

It is another object of the present invention to provide a new portable heated cup which may be easily and efficiently manufactured and marketed.

It is a further object of the present invention to provide a new portable heated cup which is of a durable and reliable construction.

An even further object of the present invention is to provide a new portable heated cup which is susceptible of a low cost of manufacture with regard to both materials and labor, and which accordingly is then susceptible of low prices of sale to the consuming public, thereby making such portable heated cup economically available to the buying public.

Still yet another object of the present invention is to provide a new portable heated cup which provides in the apparatuses and methods of the prior art some of the advantages thereof, while simultaneously overcoming some of the disadvantages normally associated therewith.

Still another object of the present invention is to provide a new portable heated cup for maintaining a liquid in a cup at a desired temperature only during use.

Even still another object of the present invention is to provide a new portable heated cup that includes a cup with a heating coil for heating the cup upon the receipt of power. Further included is a timer that is adapted to transmit an activation signal for a predetermined amount of time upon at least the instantaneous receipt thereof. Connected to the timer is a motion sensor for transmitting the activation signal thereto upon the detection of movement of the base and cup. A relay is connected between the timer, heating coil and a battery. The relay is adapted to allow the transmission of power from the battery to the heating coil only during the receipt of the activation signal.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a side view of a new portable heated cup according to the present invention.

FIG. 2 is a close-up view of the manual switch of the present invention.

FIG. 3 is an exploded perspective view of the present invention.

DESCRIPTION OF THE PREFERRED EMBODIMENT

Figure 4:
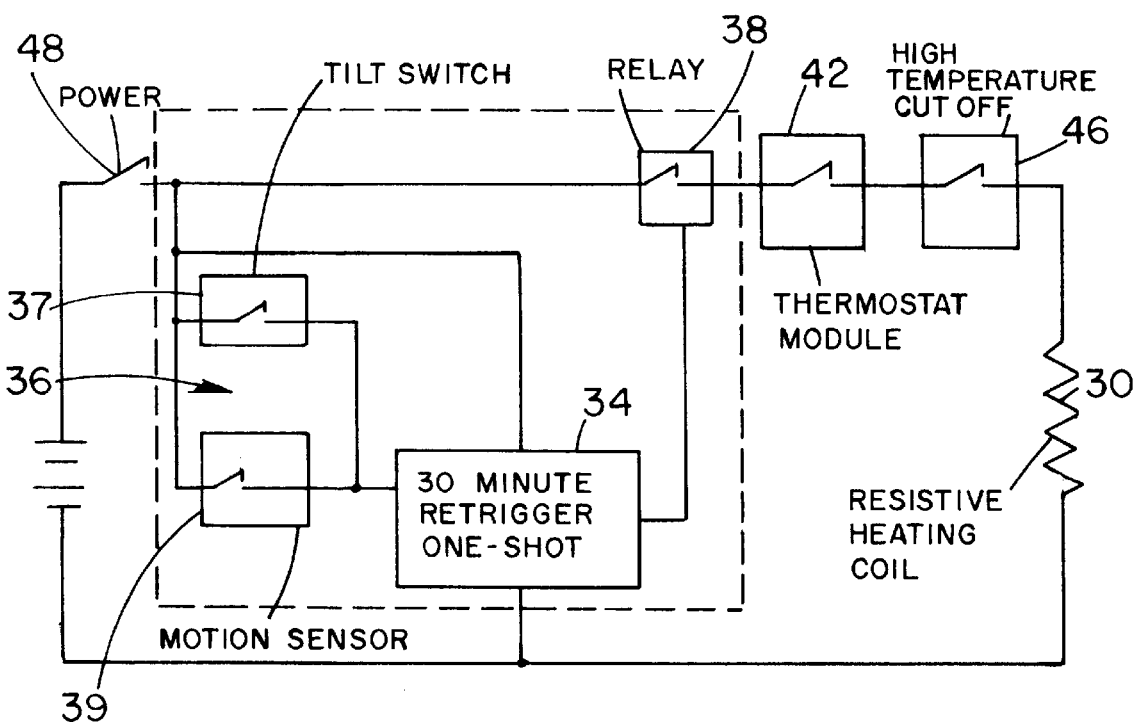
FIG. 4 is a schematic diagram of the present invention.

With reference now to the drawings, and in particular to FIGS. 1 through 5 thereof, a new portable heated cup embodying the principles and concepts of the present invention and generally designated by the reference numeral 10 will be described.

The present invention includes a cup 12 having a cylindrical configuration. As shown in FIGS. 1 & 3, the cup is equipped with a circular bottom face 14 and a periphery 16 integrally coupled thereto and extended upwardly therefrom to define an interior space and an open top for receiving fluid. The periphery of the cup has threaded grooves 18 formed in an outer surface thereof adjacent the bottom face of the cup. Such threaded grooves line greater than 5 percent of the periphery of the cup. The cup includes a closed loop handle 19 integrally coupled to a central extent of the periphery thereof and extended outwardly therefrom for gripping purposes. Preferably, the cup is constructed from a material residing in the group of materials including porcelain and ceramic. In the alternative, plastic may also be employed.

Next provided is a base 20 defined by a circular bottom face 22, a circular top face 24, and a periphery 26 formed therebetween forming an interior space. The base further includes an annular lip 28 integrally formed about a periphery of the top face of the base and extended upwardly therefrom in coaxial alignment with the periphery of the base. A plurality of threaded grooves 29 are formed in an inner surface of the annular lip for engaging the threaded grooves of the cup. When engaged, the outer surface of the cup is contiguous with an outer surface of the annular lip of the base.

Figure 5:
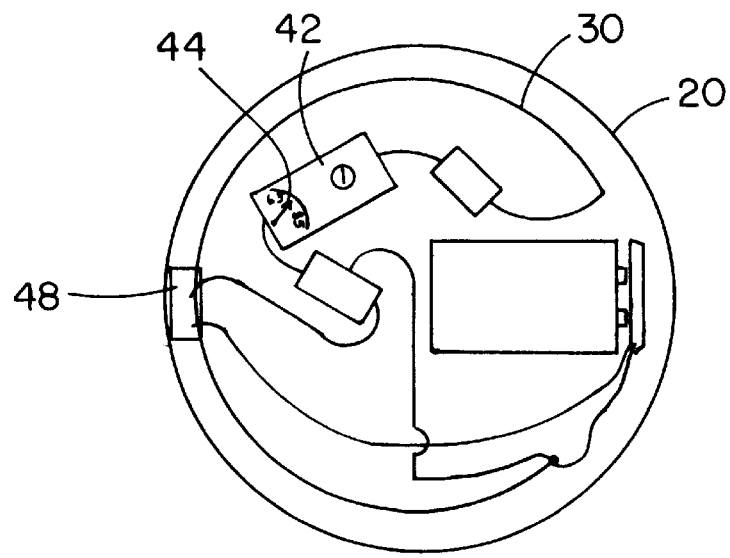
FIG. 5 is a top cross-sectional view of the interior space of the base of the present invention.

As best shown in FIGS. 4 & 5, a heating coil 30 is mounted within the annular lip and the top face of the base. In use the heating coil is adapted for heating the cup upon the receipt of power. The transfer of energy between the base and the cup is facilitated by the abutment of the top face and lip of the base with the bottom face and periphery of the cup, respectively, when screwably engaged.

A timer means 34, in the form of a 30-minute retrigeraable one-shot multivibrator, is situated within the interior space of the base and is adapted to transmit an activation signal for approximately 30 minutes upon at least the instantaneous receipt thereof. Also situated within the interior space of the base is a motion sensor means 36. Such motion sensor means is connected to the timer means for transmitting the activation signal thereto upon the detection of movement of the base and cup. It should be noted that the motion sensor means may take the form of either a tilt switch 37, motion sensor 39, or a combination thereof, in which case the switch 37 and sensor 39 are connected in parallel.

To provide adequate power to the heating coil when motion is sensed, a relay means 38 is situated within the interior space of the base and connected between the timer means, heating coil and a battery. The relay means is adapted to allow the transmission of power from the battery to the heating coil only during the receipt of the activation signal. The relay means thus functions as a voltage controlled switch and may take the form of a transistor or conventional relay. As show in FIG. 3, the base may be equipped with a hinged door 40 for allowing access to the interior space of the base for replacing the battery.

Situated within the base is a thermostat 42 connected between the relay means and the heating coil. The thermostat precludes the transfer of power to the heating coil only upon a temperature detected being greater than or equal to a first user selected temperature. To permit a user to selectively determine such first temperature, a dial 44 is provided which may be accessed either through the hinged door or the top face of the base.

For safety reasons, a high temperature cut off means 46 is connected between the relay means and the heating coil for precluding the transfer of power to the heating coil only upon a temperature detected being greater than or equal to a second predetermined temperature. Such second predetermined temperature is preferably greater than 90 Celsius. The thermostat and high temperature cut off means are preferably spaced from the top face of the base to read an accurate temperature.

Finally, a manual switch 48 is mounted within a recess 50 on the outer surface of the periphery of the base. Note FIG. 2. Such switch is connected between the battery and the heating coil for allowing the transfer of power thereto only upon the manual closing thereof. The switch ideally takes the form of a toggle switch.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A heated container comprising:
   a container with a lower periphery having a plurality of threaded grooves formed in an outer surface thereof;
   a base defined by a bottom face, a top face, and a periphery formed therebetween defining an interior space, the base further including an lip integrally formed about a periphery of the top face of the base and extending upwardly therefrom in coaxial alignment with the periphery of the base with a plurality of threaded grooves formed in an inner surface of the lip for engaging the threaded grooves of the container;
   a heating coil mounted within the lip and the top face of the base for heating the container upon the receipt of power and the engagement of the base with the cup for heating the container upon the receipt of power;
   timer means adapted to transmit an activation signal for an amount of time upon at least the instantaneous receipt of the activation signal;
   motion sensor means connected to the timer means for transmitting the activation signal thereto upon the detection of movement of the base and container;
   relay means connected between the timer means, heating coil and a battery, the relay means adapted to allow the transmission of power from the battery to the heating coil only during the receipt of the activation signal.

2. A heated container as set forth in claim 1 and further including thermostat means connected between the battery and the heating coil for precluding the transfer of power to the heating coil only upon a temperature detected being greater than or equal to a first user selected temperature.

3. A heated container as set forth in claim 1 and further including high temperature cut off means connected between the relay means and the heating coil for precluding the transfer of power to the heating coil only upon a temperature detected being greater than or equal to a predetermined temperature.

4. A heated container as set forth in claim 1 and further including a manual switch connected between the battery and the heating coil for allowing the transfer of power thereto only upon the manual closing thereof.

5. A heated container as set forth in claim 1 wherein the container includes a cup with a handle.

6. A heated container as set forth in claim 1 wherein the timer means, motion sensor means, relay means, and heating coil are situated within the base.

7. A heated container comprising, in combination:
   a cup having a cylindrical configuration with a circular bottom face and a periphery integrally coupled thereto and extending upwardly therefrom to define an interior space and an open top for receiving a fluid, the periphery of the cup having threaded grooves formed in an outer surface thereof adjacent the bottom face of the cup, the cup including a closed loop handle integrally coupled to a central extent of the periphery thereof and extending outwardly therefrom for gripping purposes, wherein the threaded grooves of the cup cover at least 5% of the periphery of the cup;
   a base defined by a circular bottom face, a circular top face, and a periphery formed therebetween defining an interior space, the base further including an annular lip integrally formed about a periphery of the top face of the base and extending upwardly therefrom in coaxial alignment with the periphery of the base with a plurality of threaded grooves formed in an inner surface of the annular lip for engaging the threaded grooves of the cup such that the outer surface of the cup is contiguous with an outer surface of the annular lip of the base;
   a heating coil mounted within the annular lip and the top face of the base for heating the cup upon the receipt of power and the engagement of the base with the cup;
   timer means situated within the interior space of the base and adapted to transmit an activation signal for approximately 30 minutes upon at least the instantaneous receipt thereof;
   a motion sensor situated within the interior space of the base and connected to the timer means for transmitting the activation signal thereto upon the detection of movement of the base and cup;
   a tilt switch situated within the interior space of the base and connected to the timer means for transmitting the activation signal thereto upon the detection of the tilting of the base and cup, wherein the tilt switch is connected in parallel with the motion sensor;
   relay means situated within the interior space of the base and connected between the timer means, heating coil and a battery, the relay means adapted to allow the transmission of power from the battery to the heating coil only during the receipt of the activation signal;
   thermostat means situated within the interior space of the base and connected between the relay means and the heating coil for precluding the transfer of power to the heating coil only upon a temperature detected being greater than or equal to a first user selected temperature, wherein a dial is included for selection of the first user selected temperature;

high temperature cut off means situated within the interior space of the base and connected between the relay means and the heating coil for precluding the transfer of power to the heating coil only upon a temperature detected being greater than or equal to a second predetermined temperature; and a manual switch mounted on the outer surface of the periphery of the base and connected between the battery and the heating coil for allowing the transfer of power thereto only upon the manual closing thereof.

* * * * *